United States Patent Office 2,781,053
Patented Feb. 12, 1957

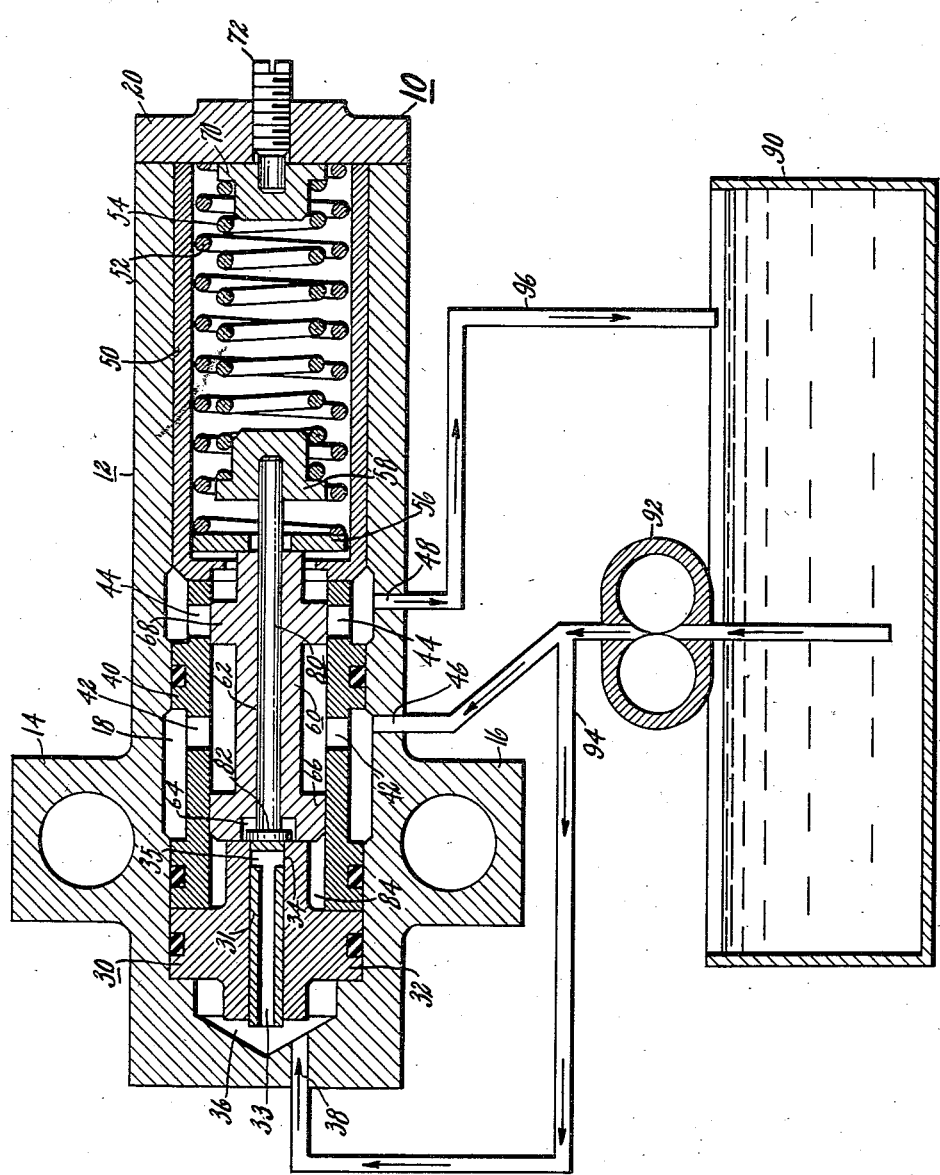

2,781,053

VALVE ASSEMBLY

Kenneth L. Berninger, Dayton, and Calvin C. Covert, Vandalia, Ohio, assignors to General Motors Corporation, Detroit, Mich., a corporation of Delaware Application May 13, 1953, Serial No. 354,828

3 Claims. (Cl. 137—492.5)

The present invention pertains to valves, and more particularly to an improved pressure relief valve assembly.

Heretofore, an inherent fault existent in pressure relief valve assemblies resided in the fact that during the pressure relieving function, the flow reaction forces tended to prematurely disrupt the pressure relieving flow. This fault accounts for the fact that accurate calibration of pressure relief valves is virtually impossible to achieve. From the foregoing, it is manifest that if a pressure relief valve assembly were designed so that the flow reaction forces have no substantial effect, or an effect which may be determined de minimus, on the pressure relieving function, such a valve assembly could be accurately calibrated. Accordingly, among our objects are the provision of a valve assembly constructed so that the effects of the flow reaction forces are substantially eliminated; the further provision of means for actuating a pressure relief valve; and the still further provision of a pressure relief valve assembly capable of accurate calibration.

The aforementioned and other objects are accomplished in the present invention by providing a pilot piston assembly, isolated from the pressure relief flow path, for controlling the servo actuation of a pressure relief valve. Specifically, the valve assembly includes a valve housing having a recess closed by an end cap. A valve sleeve, a spring guide and a pilot piston assembly are disposed within the recessed valve housing. A spring biased, servo actuated, hollow, reciprocable spool valve is mounted in the valve sleeve, the spool valve having a pair of longitudinal spaced lands, one of which cooperates with an outlet port in the sleeve. The sleeve also has an inlet port which connects with the annular channel between the spool valve lands. One end of the valve sleeve abuts a through bored member forming part of the pilot piston assembly. A pilot piston is mounted for reciprocable movement within the through bored member.

The pilot piston comprises a pin having a longitudinally extending recess that connects with a transverse bore adjacent one end thereof. The recessed end of the pin is exposed to a servo chamber formed within the valve housing. Movement of the pin by the pressure fluid in the servo chamber, is resisted by an adjustable, calibrated spring situated within the spring guide and operatively engaging the pin through a rod element, which extends through the hollow spool valve. A second spring is situated in the spring guide for normally maintaining the spool valve in a position wherein one of the lands closes the outlet port.

The pressure relief valve assembly operates in the following manner to relieve excessive system pressure when the servo chamber, aforementioned, is operatively connected to a pressure source, the inlet port is operatively connected to the same pressure source, and the outlet port is operatively connected to drain. When the source pressure obtains a potential equivalent to the calibrated spring setting, the pilot piston will be moved so that fluid under pressure is admitted to a second servo chamber associated with the spool valve. Pressure application to this second servo chamber will effect movement of the spool valve to a position wherein the inlet and outlet ports are interconnected. In this manner, excessive pressure in a fluid pressure system is relieved, and by isolating the pilot piston assembly from the pressure relieving flow, the tendency of the flow reaction forces to prematurely close the outlet port is obviated.

Further objects and advantages of the present invention will be apparent from the following description, reference being had to the accompanying drawing wherein a preferred embodiment of the present invention is clearly shown.

In the drawing:

The drawing depicts a sectional view of a pressure relief valve assembly constructed according to this invention, and a schematic illustration of a fluid pressure system associated therewith.

With particular reference to the drawing, a pressure relief valve assembly is depicted generally by the numeral 10. The pressure relief valve assembly includes a valve housing 12 having integral bracket portions 14 and 16 for attaching the housing to any suitable supporting structure, not shown. The valve housing 12 is constructed with a longitudinally extending recess 18, the open end of which is closed by an end cap 20 attached to the housing by any suitable means, not shown.

A pilot piston assembly 30, a valve sleeve 40 and a spring guide 50 are situated in abutting relation within the recess 18. The pilot piston asembly 30 includes a member 32 having a through bore 34, the member 32 having sealing engagement with the walls of recess 18 and being fixedly held against an internal shoulder of the valve housing 12. The valve housing 12 is constructed to form a servo chamber 36 with the member 30. The servo chamber 36 connects with a supply or pressure responsive port 38 of the valve housing. The member 30 supports a pilot piston for reciprocable movement within the through bore 34. The pilot piston comprises a pin 31 having a longitudinal recess 33 which connects with a transverse opening 35 adjacent the closed end of the pin.

The valve sleeve 40 abuts one end of the member 30 and also carries sealing means, which maintain fluid-tight engagement between portions of the valve sleeve and the walls of recess 18. The valve sleeve 40 includes two longitudinally spaced sets of circumferential ports 42 and 44. The set of ports 42 are connected by an annular groove formed between the valve sleeve and the housing 12 with an inlet port 46. In a similar manner, the set of ports 44 are connected with an outlet port 48 of the valve housing. A plunger, or spool valve, 60 is mounted for reciprocable movement within the valve sleeve 40. As is seen in the drawing, the plunger 60 is formed with a longitudinal through bore 62 having a counterbored portion 64 at one end. The plunger 60 further includes a pair of longitudinally spaced lands 66 and 68 separated by an anular channel, or waist. The series of ports 42 communicate with the waist between the lands 66 and 68, and when the end of land 66 abuts the end of member 32, as is shown in the drawing, the land 68 covers the set of ports designated by numeral 44.

One end of the spring guide 50 abuts the end of valve sleeve 40 and the other end abuts the end cap 20, such that the member 32, the valve sleeve 40, and a spring guide 50 are fixedly retained in position when the end cap 20 is attached to the valve housing 12. The spring guide 50 contains a pair of concentric springs 52 and 54. The ends of the larger spring 52, which need not be calibrated, seat, respectively, against the end cap 20 and an annular element 56 disposed within the spring guide and urged into abutting relation with the plunger 60 by the spring 52. The ends of spring 54, which is calibrated, seat, respectively, against a pair of spaced spring rests 58 and 70. Spring rests 58 are attached to and carried by a rod 80, which extends through the bore 62 of the spool valve 60, and has an enlarged headed portion 82 situated in the counterbore 64. The headed portion 82 abuts the closed end of pin 31, and in this manner, spring 54 is operatively associated with the pin 31 and opposes movement of the pin 31 to the right, as viewed in the drawing. The spring rest 70 is operatively associated with an adjusting screw 72, which projects through a threaded opening in the end cap 20. Spring 54 is calibrated and the stress thereof may be adjusted by means of the screw 72. In this manner, the stress of the spring 54 may be adjusted to permit movement of the pin 31 to the right at any one of a plurality of pressure potentials within the servo chamber 36.

The valve assembly also includes a second servo chamber 84, which is formed between the valve sleeve 40 in the reduced diameter portion of the member 32. Fluid under pressure is admitted to the servo chamber 84 from the servo chamber 36 through the connecting recess 33 and the transverse passage 35 in the pin 31, in a manner which will be described more fully hereinafter.

Operation

The operation of the pressure relief valve assembly, heretofore described, will be discussed in connection with the simple fluid pressure system disclosed schematically in the drawing. As shown, the fluid pressure system includes a reservoir 90 containing a quantity of fluid, and a pump 92 having connection with the reservoir for increasing the pressure potential of the fluid and supplying pressure fluid to a conduit 94. The conduit 94 includes branches having connection with pressure responsive port 38 and inlet port 46 of the valve housing 12. The outlet port 48 of the valve housing is shown being connected by a conduit 96 to the reservoir 90.

Assuming the stress of spring 54 is adjusted by screw 72 to a stress equivalent to a pressure potential of 5000 p. s. i. in the conduit 94 and the servo chamber 36, the valve assembly will operate in the following manner. When a pressure potential of 5000 p. s. i. is obtained in the servo chamber 36, the pin 31 will move to the right, thereby moving rod 80 to the right and compressing spring 54. A predetermined movement of pin 31 to the right will place the transverse passage 35 in communication with the counterbored portion 64 of the spool valve 60. Accordingly, high pressure fluid will be admitted from conduit 94 through port 38 and the servo chamber 36, through passages 33 and 35 of the pin 31 to the counterbored portion 64, which pressure fluid will effect movement of the spool valve 60 to the right a sufficient distance to permit communication between the counterbore 64 and the servo chamber 84, by compressing spring 52. Spring 52 is only stressed sufficiently to maintain spool valve 60 in abutting relation to member 32 in the absence of fluid pressure application to counterbored portion 64. When pressure fluid is admitted to the servo chamber 84, the spool valve 60 will move to the right and engage spring guide 50 to interconnect the series of ports 42 with the series of ports 44. In this manner, the excessive pressure in conduit 94 will be relieved inasmuch as flow is permitted from inlet port 46 to outlet port 48 and back to the reservoir 90.

It should be observed that the flow reaction forces of the fluid passing from the inlet port 46 to the outlet port 48 have virtually no effect on the position of spool valve 60, inasmuch as the pilot piston assembly 30, which controls the application of pressure fluid to the servo chamber 84, is structurally isolated from the pressure relieving flow. Thus, the spool valve 60 will not be returned to the position shown in the drawing until the spring stress 54 exceeds the pressure potential in servo chamber 36, at which time, the spring 54 will move the pin 31 through the rod 80 to a position wherein the passage 35 no longer connects with the counterbore 64. When this action occurs, pressure fluid is no longer supplied to the servo chamber 84 and the spring 52 may move the spool valve 60 to the position shown in the drawing.

The pressure relief valve herein disclosed may be so designed and adjusted to operate at pressure differentials on the order of a 1% change. That is, if the valve spring 54 is adjusted to permit movement of the pin 31 to the right at a pressure of 5000 p. s. i., the spring 54 will overcome the pressure potential when it is reduced to a value of 4950 p. s. i. It is further apparent that in conventional pressure relief valve assemblies, the flow reaction forces tend to disrupt the pressure relieving function before the system pressure has been properly relieved. This results in periodic actuation in the pressure relief valve at frequent intervals and, accordingly, decreases the life span of such valve assemblies. However, with the valve assembly of the type herein disclosed, the pressure relieving function will not be interrupted until the system pressure has been relieved to a safe potential.

Another advantage of the instant pressure relief valve resides in the fact that, due to its construction, the system pressure does not rise appreciably during pressure relief. That is, with the unique construction disclosed herein, substantial flows can be achieved through the outlet ports of the valve sleeve to prevent a dangerous rise in system pressure. In previous valve structures to accommodate the requisite volume of flow, the size of the valve and spring would be prohibitive in most installations.

While the embodiment of the present invention as herein disclosed, constitutes a preferred form, it is to be understood that other forms might be adopted.

What is claimed is as follows:

1. A valve assembly including, a valve housing having an inlet port, an outlet port and a pressure port, said inlet and pressure ports being subject to the same pressure fluid, a reciprocable valve element having a through bore disposed in said housing, first resilient means engaging said valve element for positioning the same to block communication between said inlet and outlet ports, a first servo chamber in said housing to which said valve element is exposed such that upon the application of fluid under pressure to said first servo chamber in opposition to said first resilient means, the valve element will move to connect said inlet and outlet ports, a second servo chamber in said housing connected to said pressure port, a reciprocable pilot member disposed in said second servo chamber, a reciprocable rod extending through the bore of said valve element and engaging said pilot member, second resilient means engaging said rod for maintaining said rod in engagement with said pilot member and opposing movement thereof, said pilot member being movable in response to a predetermined pressure of fluid in said second servo chamber acting in opposition to said second resilient means, and means connecting said first servo chamber with said pressure port upon movement of said pilot member due to said predetermined pressure of fluid in said second servo chamber, said first resilient means permitting movement of said valve element to connect the inlet and outlet ports when the pressure in said first servo chamber is less than said predetermined pressure.

2. A valve assembly including, a valve housing having an inlet port, an outlet port and a pressure port, said inlet and pressure ports being subject to the same pressure fluid, a reciprocable spool valve disposed in said housing, said spool valve having a pair of spaced lands and a central through bore, first resilient means engaging said spool valve so as to position the same so that the lands thereof block communication between said inlet and outlet ports, a first servo chamber in said housing to which said spool valve is exposed such that upon the application of fluid under pressure to said first servo chamber acting in opposition to said first resilient means, the spool valve will move to connect said inlet and outlet ports, a second servo chamber in said housing connected to said pressure port, a reciprocable pilot member disposed in said second servo chamber, a reciprocable rod extending through the bore of said spool valve and engaging said pilot member, second resilient means engaging said rod for maintaining said rod in engagement with said pilot member to oppose movement thereof, said pilot member being movable in response to a predetermined pressure of fluid in said second servo chamber acting in opposition to said second resilient means, and means for connecting said first servo chamber with said pressure port upon movement of said pilot member due to said predetermined pressure in said second servo chamber, said first resilient means permitting movement of said spool valve to connect the inlet and outlet ports when the pressure in said first servo chamber is less than said predetermined pressure.

3. A valve assembly including, a valve housing having an inlet port, an outlet port and a pressure port, said inlet and pressure ports being subject to the same pressure fluid, a reciprocable spool valve disposed in said housing, said spool valve having spaced lands and a central through bore, a first coil spring engaging said spool valve so as to position the same so that the lands thereof block communication between said inlet and outlet ports, a first servo chamber in said housing to which one end of said spool valve is exposed, such that upon the application of fluid under pressure to said first servo chamber acting in opposition to said first coil spring, the spool valve will move to connect said inlet and outlet ports, a second servo chamber in said housing connected to said pressure port, a reciprocable pilot member disposed in said second servo chamber, a reciprocable rod extending through the bore of said spool valve and engaging one end of said pilot member, a second coil spring encompassed by said first coil spring and engaging said rod for maintaining said rod in engagement with said pilot member to oppose movement thereof, said second coil spring exerting a greater spring load than said first coil spring, said pilot member being movable in response to a predetermined pressure of fluid in said second servo chamber acting in opposition to said second coil spring, and means connecting said first servo chamber with said pressure port through said second servo chamber upon movement of said pilot member due to said predetermined pressure in said second servo chamber.

References Cited in the file of this patent

UNITED STATES PATENTS

| | | |
|---|---|---|
| 1,493,064 | Brasington | May 6, 1924 |
| 2,421,133 | Towler | May 27, 1947 |
| 2,573,231 | Teague | Oct. 30, 1951 |
| 2,614,580 | Cormier | Oct. 6, 1952 |

FOREIGN PATENTS

| | | |
|---|---|---|
| 986,595 | France | of 1951 |